United States Patent [19]

Wax

[11] 4,164,036

[45] Aug. 7, 1979

[54] QUADRATURE CORRELATION PHASE REVERSAL PULSE DETECTOR

[75] Inventor: David W. Wax, Seattle, Wash.

[73] Assignee: Honeywell Inc., Minneapolis, Minn.

[21] Appl. No.: 858,301

[22] Filed: Dec. 7, 1977

[51] Int. Cl.² .................. G01R 23/02; H04M 1/50; G06F 15/34

[52] U.S. Cl. ................ 364/486; 179/84 VF; 340/6 R; 343/100 CL; 364/728

[58] Field of Search ............... 364/487, 486, 604, 728, 364/819; 178/84 VF; 343/100 CL; 340/3 E, 6 R

[56] References Cited

U.S. PATENT DOCUMENTS

| | | | |
|---|---|---|---|
| 3,546,440 | 12/1970 | Fawcett, Jr. | 364/604 |
| 3,939,463 | 2/1976 | Kelly et al. | 340/3 E |
| 3,978,445 | 8/1976 | Gravett | 343/100 CL |
| 4,017,862 | 4/1977 | Wild | 343/100 CL |
| 4,051,350 | 9/1977 | Parent | 340/6 R |
| 4,100,378 | 7/1978 | Claasen et al. | 364/728 |

FOREIGN PATENT DOCUMENTS 1482629  8/1977  United Kingdom ............... 179/84 VF

OTHER PUBLICATIONS

Claasen et al.: A Digital Receiver for Tone Detection Applications. IEEE Trans. on Communications, vol. COM-24, No. 12, Dec. 1976, pp. 1291/1300.

*Primary Examiner*—Felix D. Gruber
*Attorney, Agent, or Firm*—Charles L. Rubow

[57] ABSTRACT

Apparatus and a method are disclosed for detecting a tone pulse of known carrier frequency having a carrier phase reversal at a predetermined time by correlating a clipped version of the tone pulse signal with each of quadrature related components of a rectangular wave reference signal. Correlation is accomplished by multiplying the clipped signal with the reference signal components and sampling the two resultant product signals. Samples of each product signal are shifted through a delay register having sufficient capacity to contain samples corresponding to a complete pulse, and having an intermediate tap arranged to correspond with the timing of the phase reversal. Concurrent input and output samples of each delay register and an inverted and doubled version of the signal at its intermediate tap are combined and integrated to provide a pair of correlation signals which are rectified and summed to produce an autocorrelation signal.

19 Claims, 9 Drawing Figures

QUADRATURE CORRELATION PHASE REVERSAL PULSE DETECTOR

BACKGROUND OF THE INVENTION

The present invention relates generally to signal detection, and more specifically to apparatus and techniques employing quadrature correlation for precisely detecting coded tone pulses characterized by a known duration and carrier frequency and having a carrier phase reversal at a predetermined time during each pulse.

Tone pulses of a known carrier frequency, width and other characteristics are employed in a variety of situations for communication, detecting and locating objects and/or sound sources, and for other purposes. To the extent that the tone pulses remain relatively undistorted and of significantly higher amplitude than any background noise, pulse detection can be accomplished with relative ease and simplicity. However, there are many situations in which it is necessary to reliably and precisely detect tone pulses in a signal contaminated with noise of significant amplitude relative to the tone pulse amplitude. Conditions adverse to reliable pulse detection may, for example, occur because of substantial attenuation of the tone pulses over the signal transmission path or because of a high level of ambient noise from any of a variety of sources. Under such conditions simple amplitude and/or frequency discrimination may not provide acceptable tone pulse detection.

In certain applications it is particularly important that the pulse arrival time be determinable with a high degree of accuracy. It has been common to use leading edge detection to determine pulse arrival time. However, this method is subject to significant errors which are a function of signal level relative to detection threshold. It is also known to use pulse differentiation in determining arrival time. According to this technique, a pulse is heavily filtered so as to produce a rounded pulse envelope. The corresponding differentiation function is characterized by a zero crossing at the envelope peak. This method suffers from sensitivity to pulse distortion, which causes the peak to shift relative to the true pulse center. Accordingly, neither leading edge detection nor pulse differentiation techniques are adequate for some applications.

One particular field in which precise pulse detection has recently been of particular concern involves acoustic systems for accurately indicating marine vessel position. There is increasing interest in exploring for oil and minerals on or beneath the ocean beds in deep water, producing oil and minerals from such locations, conducting marine research in very deep water and maintaining and servicing equipment used in connection with the foregoing activities. Such activities require the ability to rapidly and accurately ascertain marine vessel position relative to a location of interest. Precise position information is also demanded in other specific applications in which it is desired to maintain fixed vessel position, or to maneuver a vessel between locations along a predetermined route in accordance with sensed parameters. Further, it is required or highly desirable to obtain this information without physical connection to the ocean bed or object of interest.

Acoustic systems have been found to possess superior characteristics for marine vessel position sensing applications. One successful type of acoustic position indicating system comprises a transponder or beacon located in a known positional relationship with an underwater point of interest, an array of acoustic signal receiving elements or hydrophones located on the vessel, means for sensing phase and/or time differences between transponder signals received at pairs of hydrophone elements and computation apparatus for determining the location of the hydrophone array relative to the transponder from the phase and/or time differences.

The hydrophone array comprises a minimum of three hydrophone elements. Two elements are located along each of two generally horizontal transverse axes, one element being common to both axes. In one specific system, the phase of the signals received by each of the hydrophone elements relative to a reference signal is periodically determined, and the phase information supplied as a succession of digital signals. Such a digital phase determining system is disclosed in detail in U.S. Pat. No. 4,038,540 for a Quadrature Correlation Pulse Detector issued July 26, 1977 in the name of J. L. Roberts and U.S. Pat. No. 4,071,821 for Quadrature Correlation Phase Determining Apparatus issued Jan. 31, 1978 in the names of W. P. Harthill and J. L. Roberts, both patents being assigned to the same assignee as the present application. Angular displacement of the vessel from the transponder in transverse vertical planes is computed from differences in the phases determined for the signals received by the hydrophone elements.

Although the previously described system has been found to provide performance superior to other types of systems, the quality of position indications produced thereby is generally dependant on acoustic paths having constant transmission characteristics between the transponder and hydrophone array. The subsea environment typically does not provide ideal acoustic transmission paths. Factors resulting in variable transmission characteristics include reflection and/or refraction of signals from thermal layers in the water, scattering of signals from water borne particles and reflection of signals from underwater structures. In addition, acoustic signals emanating from sources other than the beacon of interest may cause spurious phase determinations. These factors produce a severe acoustic signal transmission environment having effects on signal transmission which are not presently susceptible of complete analysis. As a result, the apparent arrival times for the signals received by the hydrophone elements, the corresponding time and/or phase differences, and ultimately, the indicated vessel position may deviate excessively from an accurate position representation.

One known technique for improving the timing accuracy of pulse detection involves the use of a coded tone pulse characterized by a known duration and carrier frequency, and having a carrier phase reversal during the pulse. Such a technique is discussed in Dixon, Spread Spectrum Systems, John Wiley and Sons, Inc. (1976), chapters 2 and 5. The technique is also embodied in pulse detectors disclosed in U.S. Pat. Nos. 4,004,235 and 4,013,967 issued respectively to J. L. Roberts and F. A. Fassbind on January 18 and March 22, 1977.

Another known general technique for improving signal detection involves correlation of two signals, one of which may be a reference signal. Both analog and digital forms of signal correlation are known. For example U.S. Pat. No. 3,346,862 issued to I. G. Raudsep on Oct. 10, 1967 discloses an analog autocorrelation system for determining the time difference between a pair of pulse signals of common origin. The system employs weighting filter means for modifying the power spectra of the pulsed signals to optimize the autocorrelation function. U.S. Pat. No. 3,646,334 issued to I. Wold on Feb. 29, 1972 discloses a hybrid analog/digital digital system in which two input signals to be correlated are sampled, the samples of one of the signals inserted into a recirculating memory time compressor, the output of the memory multiplied with the other signal, and the product signal averaged to determine correlation of the input signals.

Other known refinements in correlation techniques involve multiplication of the input signal with each of quadrature components of a reference signal. The product signals are integrated with respect to time to produce real and imaginary components of correlation of the input and reference signals. The real and imaginary components are combined in accordance with the Pythagorean theorem to produce an indication of correlation of the signals. An analog variation of this method is embodied in a signal processor disclosed in U.S. Pat. No. 3,878,526 issued to N. E. Pederson on Apr. 15, 1975. A digitally implemented signal detector employing elements of the method is disclosed in U.S. Pat. No. 3,925,732 issued to H. Tanaka et al on Dec. 9, 1975. The latter implementation is based on the premise that, for the application being considered, the polarity of a band limited signal contains nearly as much information as an analog signal from which it was derived. Accordingly, an analog input signal may be represented by a time series of two possible voltage states. This so called "clipped signal" may be simply and conveniently produced by a clipper or clipping amplifier.

The applicant has discovered that the advantages of mid-pulse carrier phase reversal detection, quadrature correlation and digital signal processing utilizing clipped signals may be uniquely combined to provide a simple but precise pulse detector and detection technique. This detector and detection technique have otherwise been found to possess characteristics and features which are particularly advantageous in making time and phase determinations of the quality required in marine vessel acoustic position indicating systems.

It should be noted that although the pulse detection apparatus and technique disclosed herein have been found particularly useful in marine vessel position indicating systems, the concept is of general utility. It may be implemented in a variety of ways to meet the requirements of a broad range of applications requiring precise but reasonably simple tone pulse detection.

SUMMARY OF THE INVENTION

A tone pulse detector in accordance with this invention basically comprises tone pulse signal input means, a reference signal source, a pair of signal correlation channels, correlation signal combining means and detection logic means. The signal input means is operable to supply a coded tone pulse wherein the carrier pulse is reversed at a predetermined time during the pulse, and wherein the carrier is hard limited to form a clipped signal. The reference signal source is operable to produce a pair of quadrature related rectangular wave signals, each having a repetition rate equal to the carrier frequency. The clipped signal and a separate one of the rectangular wave signals are supplied to each of the correlation channels, which respectively produce first and second correlation signals indicative of the degree of correlation of the tone pulse signal with separate quadrature components of a reference signal. The signal combining means includes rectification and summing means for rectifying and adding the correlation signals to produce an autocorrelation signal which is supplied to the detection logic means for generating a pulse detection signal.

Each correlation channel may comprise a digital multiplier for multiplying the clipped signal and one of the rectangular wave signals to produce a product signal, sampling means for sampling the product signal, delay register means having first and second portions with capacities to store all samples of a pulse respectively preceeding and following the carrier phase reversal and means for summing concurrent input and output samples of the delay register and an inverted and doubled version of the sample at the output of the first register portion.

The method of the applicant's invention comprises correlating a carrier pulse reversal coded tone pulse signal with each of quadrature related components of a reference signal to produce first and second correlation signals, rectifying the correlation signals, summing the rectified correlation signals to produce an autocorrelation signal and generating a pulse detection signal when the autocorrelation signal indicates the presence of a tone pulse.

A primary object of this invention is to provide a unique correlation type detector and detection method for precisely detecting coded tone pulses.

A further object is to provide a correlation type detector and detection method for detecting tone pulses in which the carrier signal is characterized by a mid-pulse phase reversal.

A further object is to provide a coded tone pulse detector and detection method utilizing clipped quadrature correlation techniques.

A further object is to provide a relatively simple predominantly digital apparatus and technique for precisely detecting tone pulses.

Yet a further object is to provide a tone pulse detection technique and apparatus particularly suitable for use in acoustic position indicating systems.

Additional objects of this invention may be ascertained from a study of the following description, drawings and claims.

DESCRIPTION OF THE PREFERRED EMBODIMENT

Figure 1:
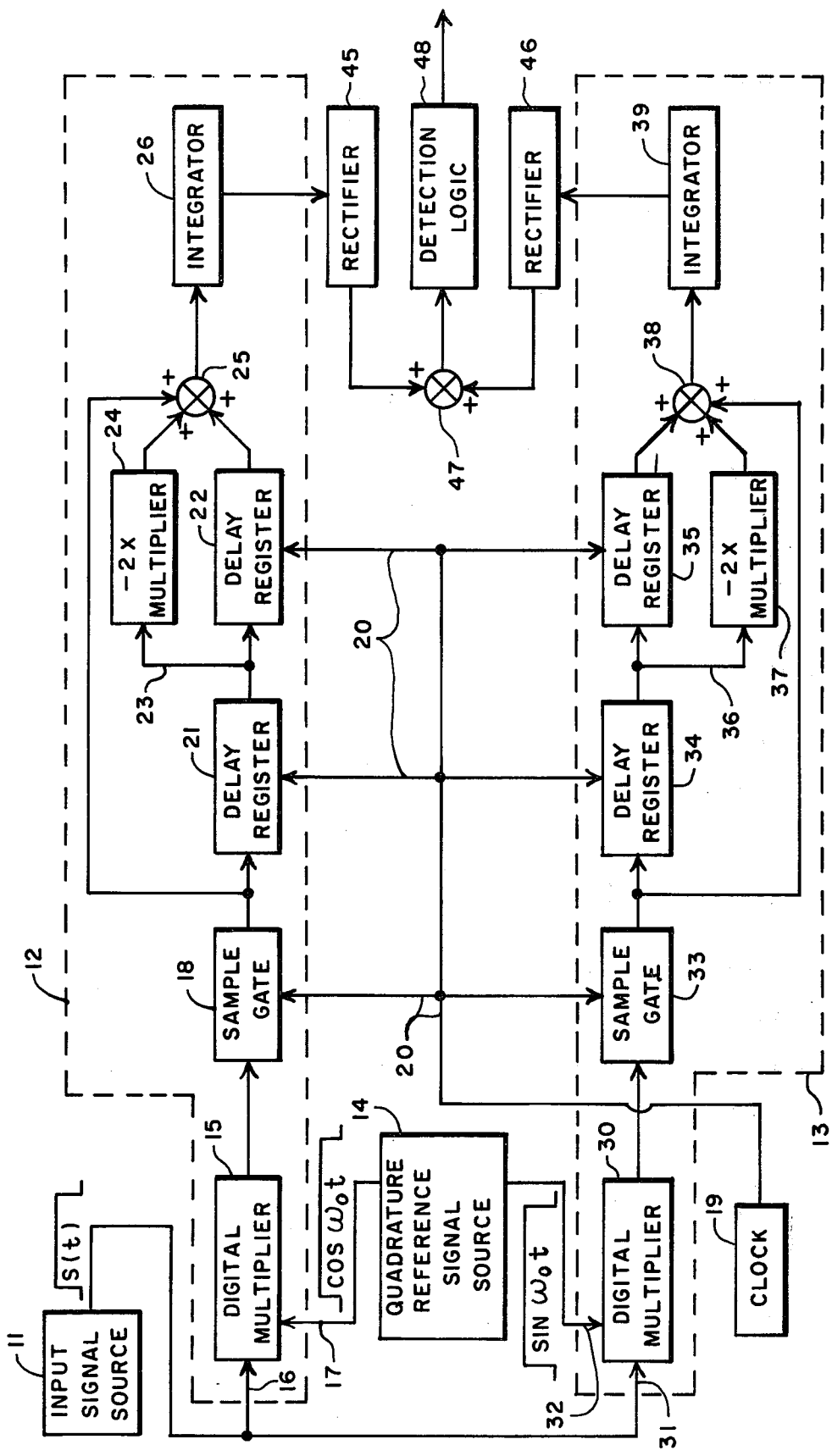
FIG. 1 is a block diagram illustrating the pulse detection concept and functional principles of the applicant's pulse detector.

For purposes of facilitating an understanding of the present invention, the following is a brief description of the underlying theory. The invention is based on matched filtering of a coded signal to obtain its optimum autocorrelation function. The coding comprises one or more carrier signal phase reversals at predetermined times during each pulse.

In general, if a tone signal is multiplied by a reference signal of the same frequency as the tone signal, the resultant signal comprises the base band or envelope signal pulse higher frequency components centered about harmonics of the carrier frequency. The higher frequency components may be removed by low pass filtering to leave only the base band signal, comprising a coded sequence of levels having values of $+a$ and $-a$, where "a" has a magnitude less than or equal to 1. The magnitude of a is a function of the phase of the carrier signal with respect to the reference signal. When the carrier signal is exactly in phase with the reference signal, a has the magnitude of $+1$. When the carrier signal is completely out of phase with the reference signal, a has a value of $-1$. When the carrier signal is 90° out of phase with the reference signal, a has a value of 0.

In order for the described relationships to be directly applicable to signal detection, the relative phases of the carrier and reference signals must be fixed. However, this requirement can be avoided by employing quadrature correlation techniques. Specifically, a quadrature detector comprising two (real and imaginary) correlation channels utilizing quadrature reference signal components will provide two quadrature related correlation signals, the absolute magnitudes of which can be summed to provide an autocorrelation signal which is not sensitive to phase angle.

The correlation process is performed as follows in each correlation channel. For simplicity, it is assumed that the input signal is completely in phase or out of phase with the reference signal. Consequently, the result of the multiplication operation in the real correlation channel will be at time sequence of $+1$ and $-1$ signal elements. The output of the imaginary correlation channel will be zero.

A $+1$ and $-1$ sequence which is finite and not periodic corresponds to a unique coded waveform. If the input signal is a periodic tone pulse having a mid-pulse carrier pulse reversal as shown in FIG. 3(a) and the carrier signal during the leading portion of the tone pulse is out of phase with the reference signal, the produce has the waveform shown in FIG. 3(b). It should be noted that the input signal could also be characterized by other phase reversal sequences which would also result in unique coded waveform products. A detailed discussion of waveforms suitable for use in an autocorrelation process is contained in Berkowitz, Modern Radar, John Wiley and Sons, Inc. (1965), chapter 4.

The autocorrelation function $C(\tau)$ of a periodic waveform, such as shown in FIG. 3(b), is given by:

$$C(\tau) = \int_0^T x(t)x(t+\tau)dt$$

where x(t) is the coded waveform function and T is the period of x(t). An infinite integrator may be used to obtain the same result in accordance with the following relationship:

$$C(\tau) = \int_0^T [x(t)-x(t-T_c)]dt$$

where $T_c$ is the time duration of each signal element of the coded waveform and $x(t)=0$ for $t<0$.

This autocorrelation expression may be carried out by summing together the individual correlations corresponding to each signal element, delayed from each other by a time interval equal to $T_c$. Correlation outputs for negative signal elements must be multiplied by $-1$ before summing so that all individual element correlations are of the same polarity upon occurrence of the maximum accumulated correlation at the end of the complete coded waveform.

An equivalent result can be obtained with a delay line of length $NT_c$, where N is the number of signal elements in a coded waveform. The delay line includes an intermediate tap corresponding to the timing of each phase reversal in the coded waveform. Each tap output is multiplied by $-2$ and summed together with the concurrent input signal to the delay line and output signal therefrom. The delay line input, intermediate tap and output signals for the tone pulse input signal of FIG. 3(a) are illustrated in FIGS. 3(b)-3(d) respectively. The inverted and doubled version of the intermediate tap signal is shown in FIG. 3(e). FIG. 3(f) illustrates the summation of signals illustrated in 3(b), 3(d) and 3(e). The summation signal is integrated to produce the correlation signal of FIG. 3(g) and rectified as shown in FIG. 3(h) to facilitate comparison with a threshold reference.

It should be noted that if there had been a nonzero output from the imaginary correlation channel, it would have been rectified and added to the rectified correlation signal from the real correlation channel. The output of the real correlation channel would have been correspondingly reduced in amplitude. Accordingly, the summation of the outputs from the real and imaginary correlation channels would be an autocorrelation signal identical to that illustrated in FIG. 3(g).

Figure 3:
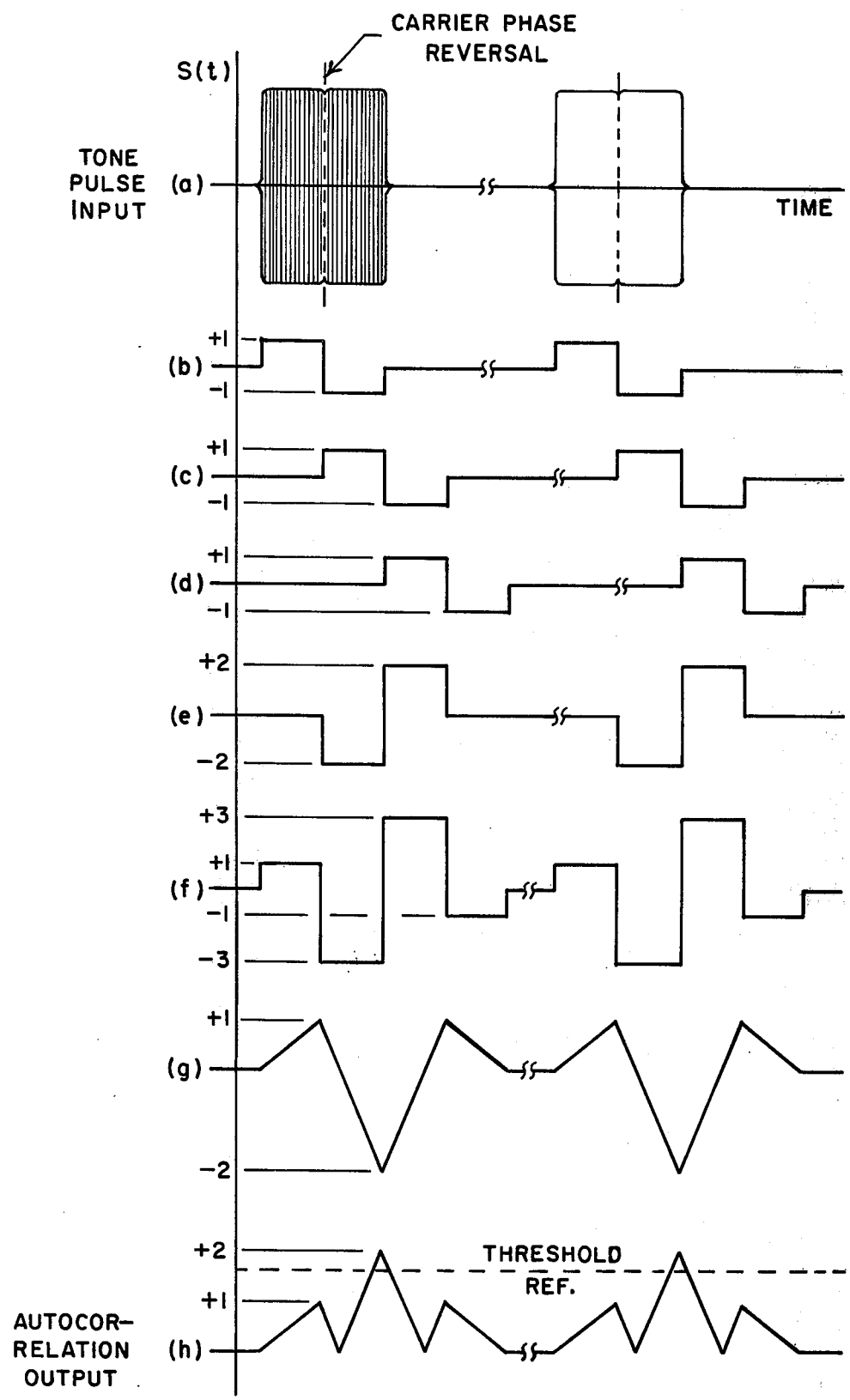
FIG. 3 illustrates basic waveforms of signals involved in generating the autocorrelation signal for a tone pulse with a mid-pulse carrier phase reversal.

The following observations can be made based on FIG. 3:

(1) A maximum correlator output will be produced only when the correctly matched waveform is received.

(2) Improved time of arrival measurement accuracy is obtained through compression of the main lobe of the autocorrelation signal relative to the coded waveform. For a single phase reversal, the main lobe of the autocorrelation signal is one third the width of a corresponding lobe produced for an uncoded waveform of equal duration.

(3) The maximum autocorrelation peak is caused by decorrelation resulting from the polarity reversal in the coded waveform. The polarity reversal produces a reversal of the autocorrelation function slope which is independent of noise, and which may be used to accurately determine the time at which the peak occurs.

(4) Delayed replicas of the coded waveform, as may arise from multipath signals, may be distinguished from the earliest (direct path) waveform, provided the later waveforms are delayed for a period of time no less than the duration of the main lobe of the autocorrelation function.

With reference to the tone pulse detector shown in block diagram form in FIG. 1, numeral 11 identifies an input signal source which supplies a clipped input signal $\lfloor S(t) \rfloor$ to following portions of the detector. The clipped input signal may have been derived from a signal received by a transducer, antenna or other signal receiver. The received signal is assumed to include coded tone pulses of interest as shown in FIG. 3(a). In actual practice, the tone pulses may be distorted and may have random noise superimposed thereon. The pulses of interest are of a known carrier frequency and pulse duration. The carrier signal is characterized by a phase reversal at the mid-point of each pulse.

Figure 2A:
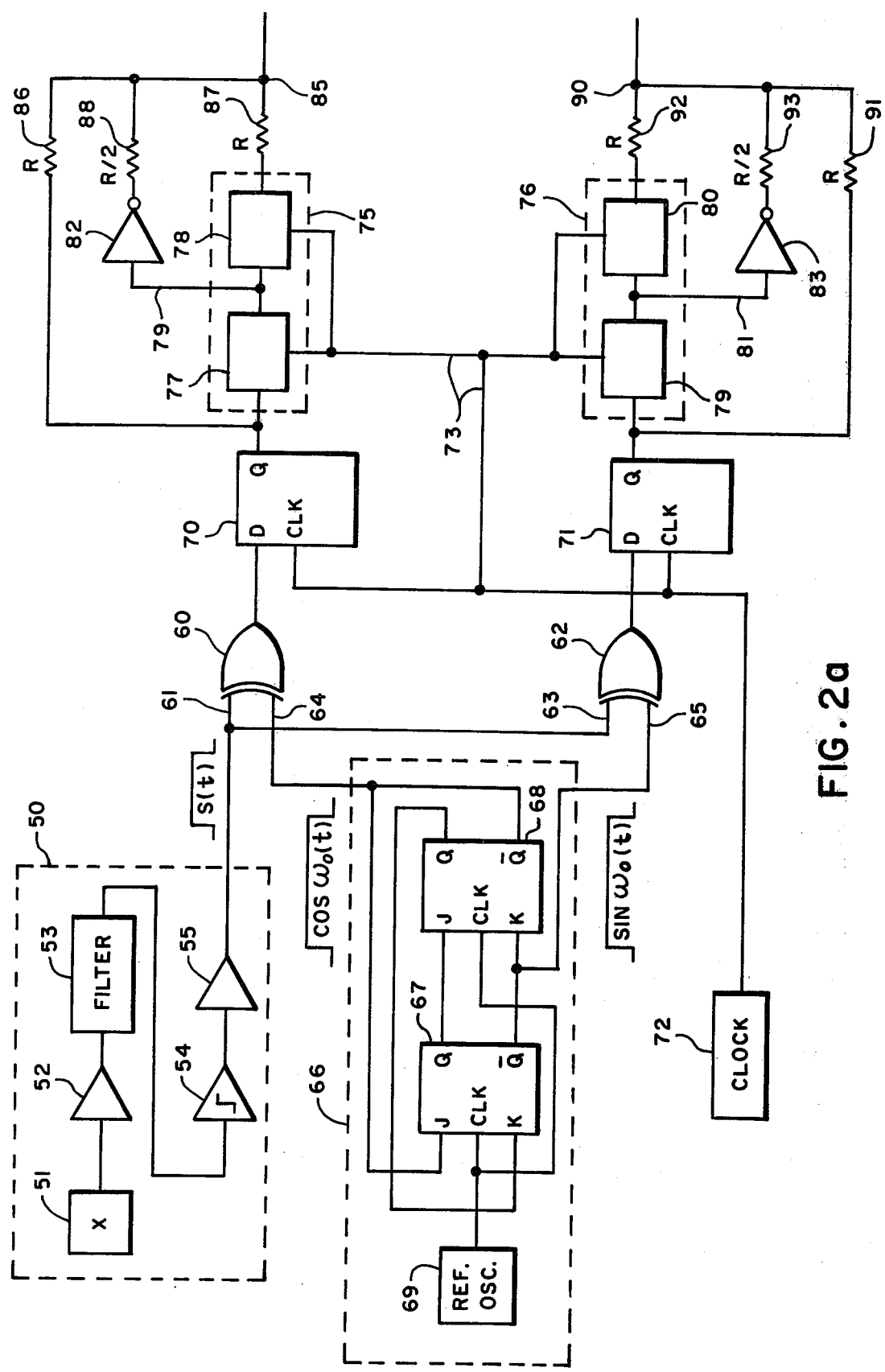
FIGS. 2a and 2b are a schematic of the preferred embodiment of the tone pulse detector of FIG. 1.
Figure 2B:
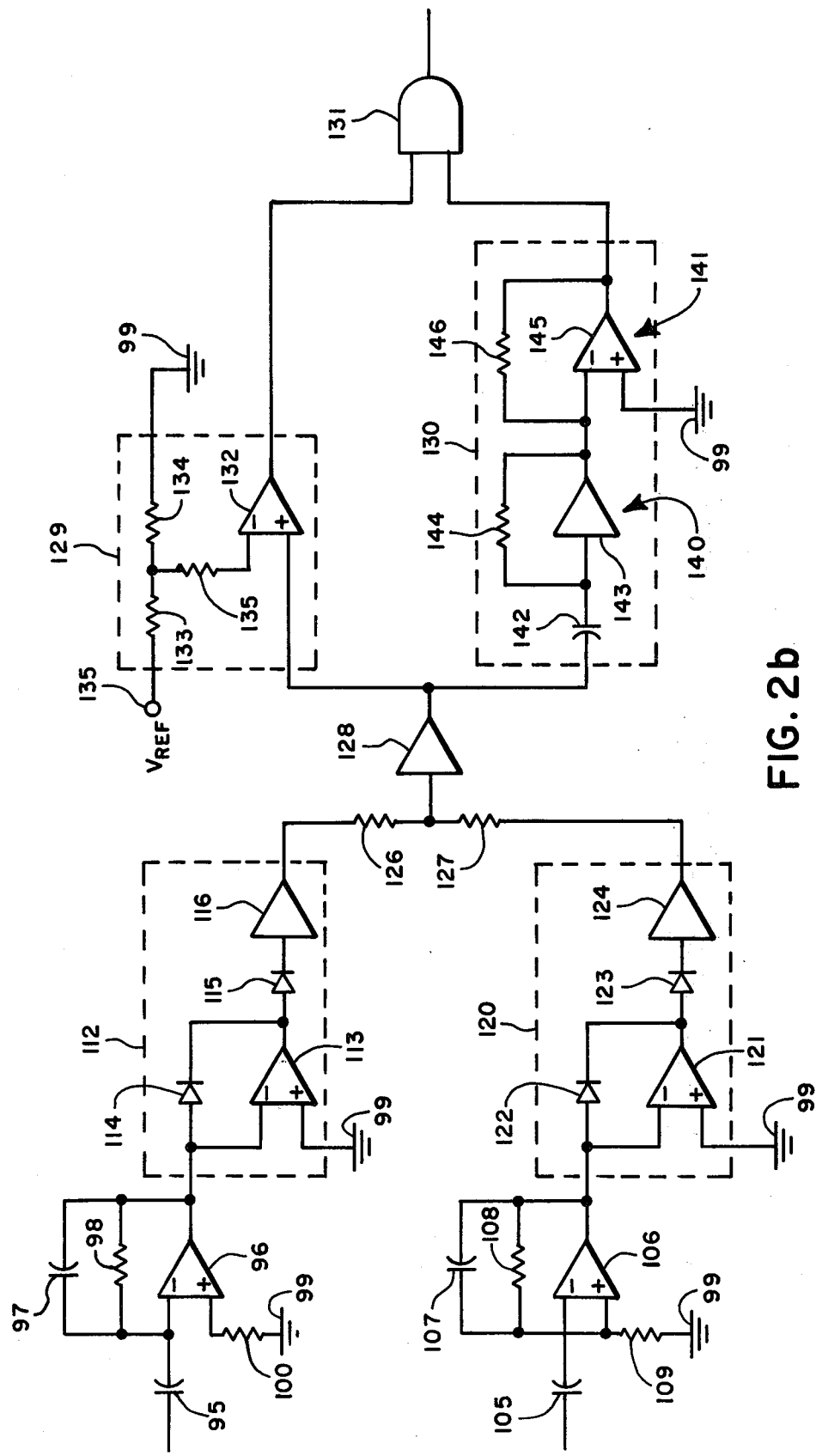
Figure 4:
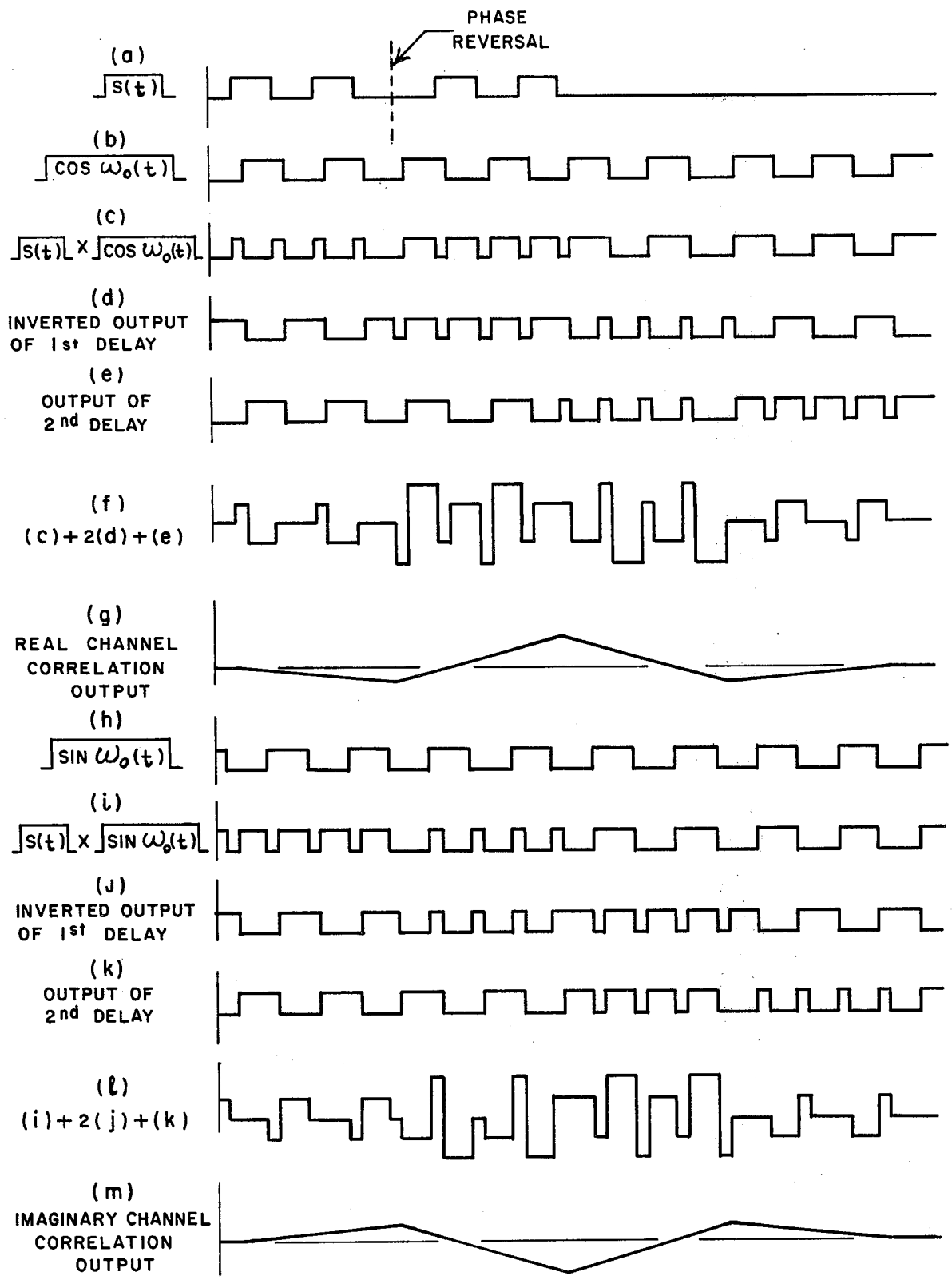
FIG. 4 illustrates waveforms and relative timing of signals at various points in quadrature correlation channels in the applicant's tone pulse detector.

Input signal source 11 contains means, of which an example is shown in greater detail in FIG. 2, for normalizing the amplitude of the received signal by hard limiting or clipping so as to limit the amplitude to a predetermined level. The clipping process preserves the information contained in the zero crossings of the received signal. The clipped signal $\lfloor S(t) \rfloor$ comprises a rectangular waveform having upper and lower amplitudes which represent values of +1 and −1 respectively. A clipped signal for a simple coded tone pulse is illustrated in FIG. 4(a). A single pulse comprising four cycles of carrier with a mid-pulse carrier phase reversal is shown for illustrative purposes. In actual practice a pulse would typically include a considerably greater number of cycles of carrier signal.

Clipped signal $\lfloor S(t) \rfloor$ is supplied to real and imaginary correlation channels 12 and 13 which respectively receive first and second rectangular wave signals $\lfloor \cos \omega_o (t) \rfloor$ and $\lfloor \sin \omega_o (t) \rfloor$ from a quadrature reference signal source 14. As apparent from the signal functions, these rectangular wave signals are 90° out of phase, or in quadrature, with one another. They also have a repetition rate equal to the carrier frequency of the received tone pulse, and upper and lower amplitudes representing values of +1 and −1. Representative rectangular wave quadrature reference signals are illustrated in FIGS. 4(b) and 4(h). The rectangular wave signals may be considered quadrature components of a reference signal.

Correlation channel 12 comprises a digital multiplier 15 having a first input terminal 16 to which the clipped signal is supplied, a second input terminal 17 to which the first rectangular wave signal is supplied and an output terminal. Multiplier 15 produces a first product signal having a rectangular waveform as illustrated in FIG. 4(c). This waveform is representative of the waveform which would be produced by implementing multiplier 15 with an exclusive OR circuit. Such a circuit produces a low output only when both inputs have corresponding amplitudes. It should be noted, however, that the multiplication function may be implemented in a variety of ways which may result in other waveforms. The essential operation is that a characteristic output be produced only when both input signals have corresponding values.

The first product signal is supplied to a sample gate 18 which has a control terminal connected to a clock 19 through conductors 20. Sample gate 18 is caused to sample the product signal at a sample rate which is at least twice the highest frequency of interest in the envelope of the tone pulse and is not integrally related to the carrier frequency. A sample train corresponding to waveform 4(c) is supplied to delay register means comprising first and second register portions 21 and 22. The delay register, which may comprise one or more shift registers, operates under the control of the timing signal on conductors 20 to accept the sample train from sample gate 18, and shift the samples seriatum to the delay register output terminal. Delay register portions 21 and 22 thus serve to define a time interval of fixed duration determined by the number of storage locations therein and the rate at which samples are shifted therethrough.

The delay register includes an intermediate tap 23 between register portions 21 and 22. The location of the intermediate tap corresponds to the timing of the carrier phase reversal in the tone pulse. Accordingly, for the present example both register portions include the same number of storage locations. The total number of storage locations is just sufficient to contain all samples of the product of a tone pulse and one of the quadrature components of the reference signal.

The sample train at intermediate tap 23, of which a corresponding inverted waveform is shown in FIG. 4(d), is supplied to multiplier means 24 which inverts and doubles the amplitude of the samples. The input sample train to delay register portion 21, the concurrent output sample train from delay register portion 22 (corresponding to waveform 4(e)) and the output signal of multiplier 24 are supplied to a summing means 25. The output signal of summing means 25, which corresponds to waveform 4(f), is supplied to an integrator means 26 which produces a real channel correlation signal as shown in FIG. 4(g).

Correlation channel 13 is identical to correlation channel 12. It comprises a digital multiplier 30 having first and second input terminals 31 and 32 respectively connected to receive the clipped signal $\lfloor S(t) \rfloor$ and rectangular wave signal $\lfloor \sin \omega_o t \rfloor$ from quadrature reference signal source 14. Correlation channel 13 also includes a sample gate 33 which is connected to receive the output signal of digital multiplier 30, first and second delay register portions 34 and 35 having an intermediate tap 36 therebetween, an inverter and amplitude doubler 37 connected to the intermediate tap, a summing means 38 connected to receive the input and output samples of delay register means 34, 35 and the output signal of multiplier 37, and an integrator 49.

The signals supplied to multiplier 30 are shown in FIGS. 4(a) and 4(h). A sample train corresponding to the product signal (waveform 4(i)) is supplied to delay register means 34, 35. The concurrent sample train at the intermediate tap and the output sample train from the delay register correspond to inverted waveform 4(j) and waveform 4(k). The output signal of summing means 38 corresponds to waveform 4(l), and the correlation signal produced by integrator 39 is shown in FIG. 4(m).

Figure 5:
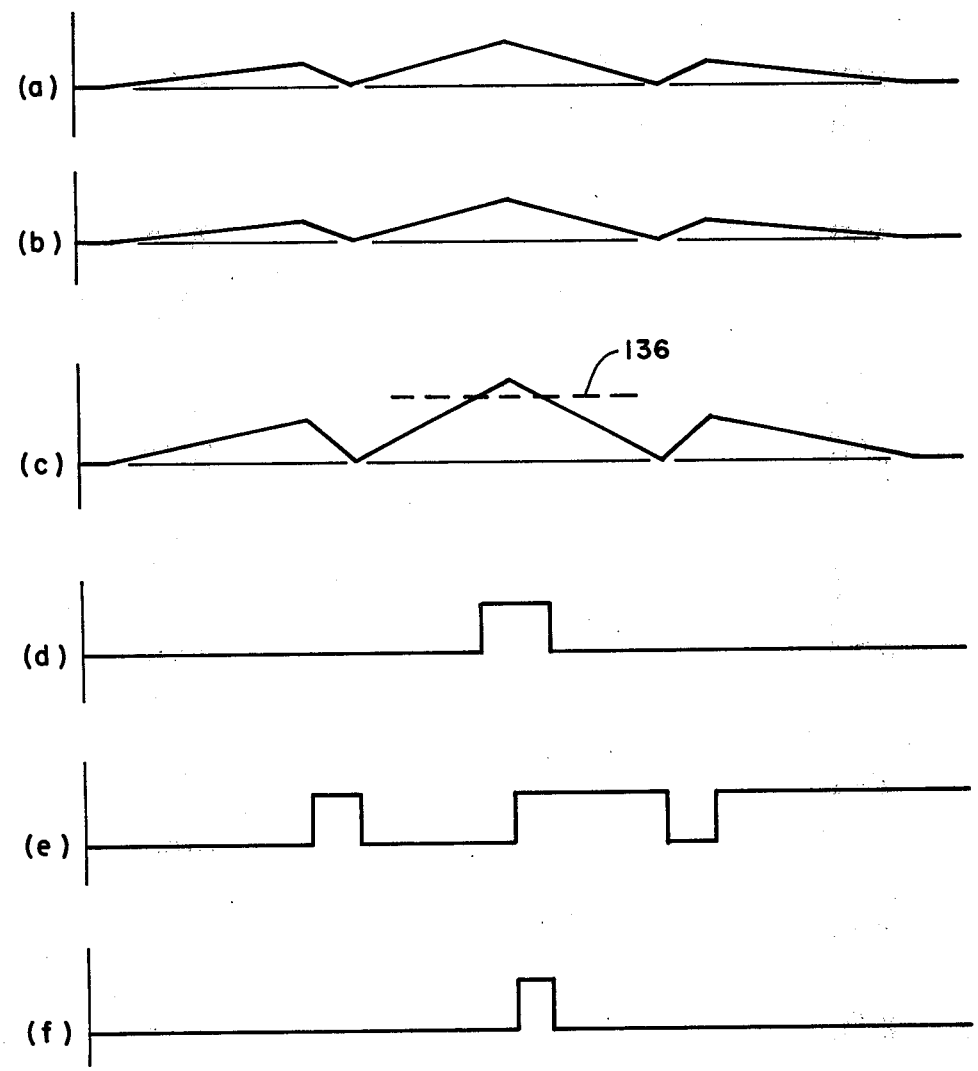
FIG. 5 illustrates waveforms of signals involved in producing a pulse detection signal from the correlation signals shown in FIG. 4.

The correlation signals produced by correlation channels 12 and 13 are combined by means of a pair of rectifiers 45 and 46 and a summing means 47 to produce a signal representative of the autocorrelation of the input tone pulse. The rectifiers convert the correlation signals shown in FIGS. 4(g) and 4(m) into the form shown in FIGS. 5(a) and 5(b) respectively. The output signals of the rectifiers are added to produce an autocorrelation signal as shown in FIG. 5(c). The autocorrelation signal is supplied to a detection logic circuit 48 which produces a pulse detection signal as shown in FIG. 5(f) when the autocorrelation signal exhibits characteristics indicative of the presence of a tone pulse input signal.

With reference to the schematic of FIG. 2, reference numeral 50 identifies an input signal source which is shown as comprising a transducer 51, a preamplifier 52, a bandpass filter 53, a clipping amplifier 54 and a buffer amplifier 55. Transducer 51, which is shown as a hydrophone, is provided for sensing an input pulse signal comprising tone pulses of a known duration and carrier frequency, and characterized by a mid-pulse carrier phase reversal. The sensed signal is supplied to preamplifier 52 and then to bandpass filter 53 which passes signal frequency components within a frequency band of interest. The filtered signal is hard limited or clipped by means of clipping amplifier 54 to produce a rectangular wave signal having either of two instantaneous amplitudes. The clipped signal is identified as $\sqsubset S(t)\sqsupset$. An exemplary portion of a clipped signal resulting from a simplified input pulse has a waveform as shown in FIG. 4(a). Signal $\sqsubset S(t)\sqsupset$ is supplied to a first exclusive OR circuit 60 through a first input terminal 61, and to a second exclusive OR circuit 62 through a first input terminal 63. Exclusive OR circuits 60 and 62 function as digital multipliers for multiplying signal $\sqsubset S(t)\sqsupset$ with quadrature components of a rectangular wave reference signal supplied to second input terminals 64 and 65 of the OR circuits.

Numeral 66 identifies a reference signal source which generates first and second rectangular wave signals comprising quadrature components $\sqsubset \cos \omega_o t \sqsupset$ and $\sqsubset \sin \omega_o t \sqsupset$ of a rectangular wave reference signal, as illustrated in FIGS. 4(b) and 4(h). Signal source 66 is shown as comprising a pair of cross-coupled JK flip flops 67 and 68 of which the J, Q, K and $\overline{Q}$ terminals of the flip flop 67 are connected to the $\overline{Q}$, J, Q and K terminals respectively of flip flop 68. Rectangular wave signal $\sqsubset \cos \omega_o(t)\sqsupset$ is produced at the junction of the J and $\overline{Q}$ terminals of flip flops 67 and 68 respectively, and is supplied to input terminal 64 of exclusive OR circuit 60. Rectangular wave signal $\sqsubset \sin \omega_o(t)\sqsupset$ is produced at the junction of the $\overline{Q}$ and K terminals of flip flops 67 and 68 respectively, and is supplied to input terminal 65 of exclusive OR circuit 62. The clock terminals of flip flops 67 and 68 are supplied with a timing pulse train which originates in a reference oscillator 69.

Exclusive OR circuits 60 and 62 produce first and second product signals, as illustrated in FIGS. 4(c) and 4(i), which are supplied to the D terminals of edge triggered flip flops 70 and 71 respectively. Flip flops 70 and 71 serve to sample the product signals at a rate determined by a timing signal at clock terminals of the flip flops, and supply sample trains indicative of the amplitudes of the product signals at the sampling instants. The sampling rate is at least twice the highest frequency of interest in the envelope of the tone pulse input signal. In addition, the sampling rate should not be integrally related with the carrier frequency.

The clock terminals of flip flops 70 and 71 are supplied with a timing pulse train which originates in a clock 72. Clock 72 also supplies timing and synchronization signals to various other portions of the tone pulse detector through conductors 73.

The output signals of flip flops 70 and 71 are supplied to the input terminals of shift registers identified by reference numerals 75 and 76 respectively. Each shift register contains a plurality of storage locations sufficient in number to contain all samples of a product signal corresponding to an input tone pulse. As shown, each shift register includes an intermediate tap which separates groups of storage locations sufficient in number to contain all samples preceding and following the carrier phase reversal. For explanatory purposes, shift register 75 comprises first and second shift register portions 77 and 78 between which is located an intermediate tap 79. Shift register 76 comprises first and second shift register portions 79 and 80 between which is located an intermediate tap 81. Sample trains concurrently appearing at the input, intermediate tap and output terminals of shift register 75 correspond to waveforms 4(c), 4(d) inverted and 4(e) respectively. The sample trains concurrently appearing at the input, intermediate tap and output terminals of shift register 76 correspond to waveforms 4(i), 4(j) inverted and 4(k) respectively.

Intermediate taps 79 and 81 are connected to inverters 82 and 83 respectively. The input and output sample trains of each shift register and the output signal of the inverter associated therewith are combined by means of a summing resistor network. Specifically, the input and output sample trains of shift register 75 are supplied to a summing point 85 through resistors 86 and 87 each having a resistance value R. The output of inverter 82 is connected to summing point 85 through a resistor 88 having a value R/2. Accordingly, the amplitude of the output signal of inverter 82 is doubled relative to the amplitudes of the input and output signals of shift register 75 as the signals are combined at the summing point. Similarly, concurrent input and output sample trains of shift register 76 are supplied to a summing point 90 through resistors 91 and 92 each having a resistance value R. The output signal of inverter 83 is supplied to summing point 90 through a resistor 93 having a value R/2.

The signal at summing point 85 is supplied through a coupling capacitor 95 to an analog integrator circuit comprising an operational amplifier 96, a feedback capacitor 97 and a feedback resistor 98 connected in parallel with capacitor 97. Coupling capacitor 95 removes the DC bias from the output signal of the summing network associated therewith. The product of the capacitance of the coupling capacitor and the effective resistance of the summing network provides a time constant which is much greater than the duration of the coded pulse waveform so as to minimize bias effects from any unbalance of the input waveform to the integrator.

The coupling capacitor and feedback network are connected to the inverting input of the amplifier. A reference level for the integrator is established by connecting the noninverting input of amplifier 96 to a reference potential source or ground 99 through a resistor 100. The values of capacitor 97 and resistor 98 are selected so that the time constant of the integrator is much greater than the duration of a signal element in the coded waveform. Accordingly, linear integration is closely approximated. Further, the value of feedback resistor 98 is selected to minimize bias offsets of amplifier 96.

The signal at summing point 90 is supplied through a coupling capacitor 105 to an integrator circuit identical to the integrator circuit including amplifier 96. The integrator circuit connected to coupling capacitor 105 comprises an operational amplifier 106 having its inverting input terminal connected to capacitor 105, and having a feedback circuit comprising a capacitor 107 connected in parallel with a resistor 108. The noninverting input of amplifier 106 is connected to ground 99 through a resistor 109. The output signals of the integrator circuits are representative of the correlations of the tone pulse input signal with quadrature components of the reference signal, and are illustrated in FIGS. 4(g) and 4(m) respectively.

The correlation signal indicative of correlation with the in-phase quadrature reference signal component is supplied to a rectifier circuit 112 which comprises an operational amplifier 113 having its noninverting input terminal connected to ground 99 and its inverting input terminal connected to receive the correlation signal. The correlation signal is also supplied to the anode of a diode 114 connected between the inverting input and output terminals of the amplifier. The output terminal of amplifier 113 is connected to the anode of a diode 115 having its cathode connected to the input terminal of a buffer amplifier 116. Rectifier circuit 112 functions to produce a correlation signal which is of only one polarity relative to the reference potential or ground.

Similarly, the correlation signal indicative of correlation of the tone pulse input signal relative to the quadrature component of the reference signal is supplied to a rectifier circuit 120 identical to rectifier circuit 112. Rectifier circuit 120 comprises an operational amplifier 121, a pair of diodes 122 and 123 and a buffer amplifier 124.

The rectified correlation signals at the output terminals of rectifier circuits 112 and 120 are combined in a summing network comprising a pair of resistors 126 and 127. The combined signal at the junction of the resistors is indicative of autocorrelation of the tone pulse input signal. It is supplied through a buffer amplifier 128 to detection logic means comprising a threshold detector 129, a peak detector 130 and an AND circuit 131. Threshold detector 129 comprises an operational amplifier 132 having a noninverting input terminal connected to receive the autocorrelation signal from amplifier 128 and an inverting input terminal connected to receive a threshold signal. The threshold level is set by a voltage divider network comprising a pair of series connected resistors 133 and 134 connected between a source of reference voltage 135 and ground 99. The junction between resistors 133 and 134 is connected to the inverting input terminal of amplifier 132 through a resistor 135. Threshold detector 129 produces a high output when the amplitude of the autocorrelation signal exceeds a threshold level set by the voltage divider. The threshold level is indicated by dashed line 136 in FIG. 5(c). The output signal of threshold detector 129 is shown in FIG. 5(d).

Peak detector 130 comprises a differentiator generally identified by reference numeral 140 and a zero crossing detector generally identified by reference numeral 141. Differentiator 140 comprises a capacitor 142 in series with an amplifier 143 having a feedback resistor 144 connected between its output and input terminals. Zero crossing detector 141 comprises an operational amplifier 145 having its inverting input terminal connected to the output terminal of amplifier 143 and its noninverting input terminal connected to ground 99. A feedback resistor 146 is connected between the output and inverting input terminals of amplifier 145. Peak detector 130 produces a high output signal following each positive going peak in the autocorrelation signal, as illustrated in FIG. 5(e). Positive going peaks are detected by differentiating the autocorrelation function and detecting the state of the differentiator output signal. The output signals of threshold detector 129 and peak detector 130 are supplied to AND circuit 131 which produces a high output signal as illustrated in FIG. 5(f) when high output signals are simultaneously produced by threshold detector 129 and peak detector 130.

Figure 6:
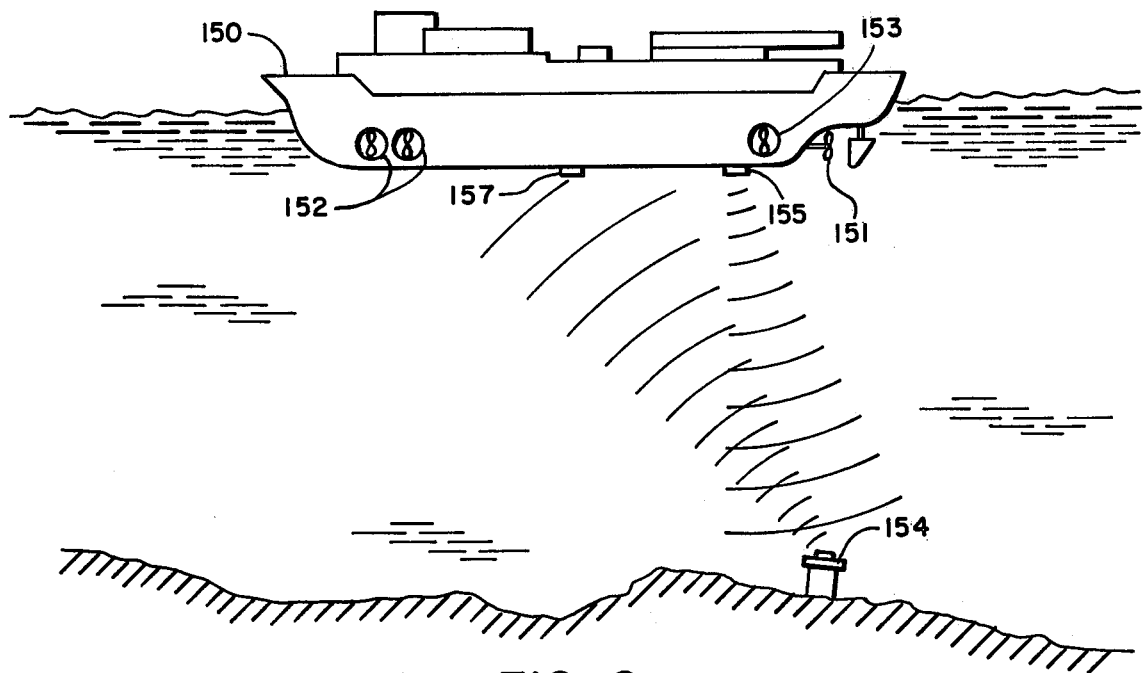
FIG. 6 is a schematic illustration of a marine vessel employing an acoustic position indicator system in which the present tone pulse detector may be advantageously used.
Figure 8:
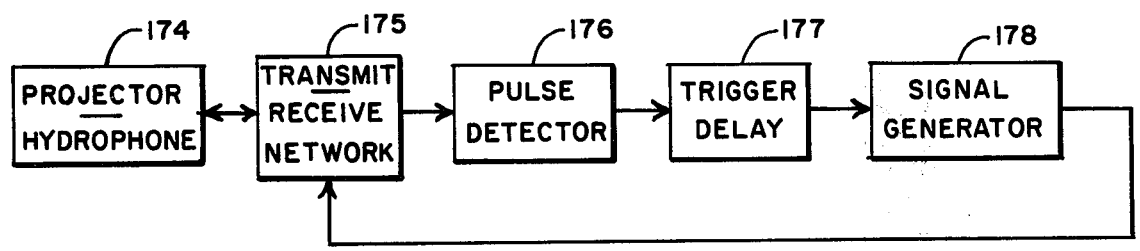
FIG. 8 is a generalized block diagram of a transponder including the present tone pulse detector suitable for use in the acoustic position indicator system of FIGS. 6 and 7.
Figure 7:
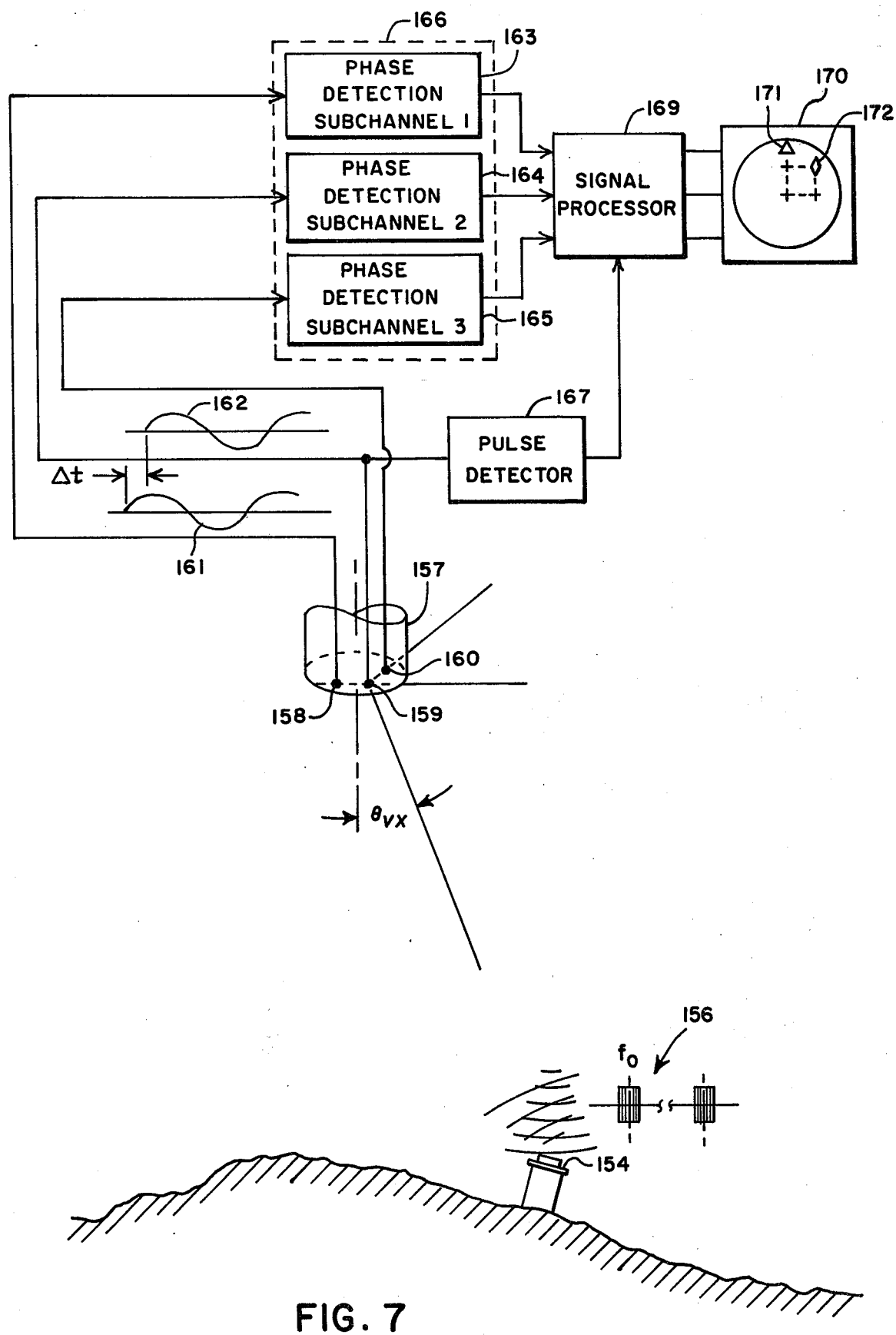
FIG. 7 is a generalized block diagram of a marine vessel acoustic position indicator system as utilized in FIG. 6.

FIGS. 6-8 illustrate the general features of a marine vessel acoustic position indicating system in which the applicant's unique pulse detector may be advantageously employed. In FIG. 6, reference numeral 150 identifies a floating marine vessel designed and equipped to perform an activity which requires information as to its horizontal position relative to an underwater point of interest. Vessel 150 is shown equipped with a main screw 151 and fixed azimuth transverse thrusters 152 and 153. For illustrative purposes, thrusters 152 and 153 are shown as tunnel thrusters.

As is well known, the main screw and transverse thrusters or other propulsion units may be automatically controlled in response to signals derived from sensed location and heading of vessel 150. Heading may be sensed by means of a gyrocompass, magnetic compass or other suitable heading sensor. Horizontal location in two vertical planes may be sensed by means of acoustic position indicating apparatus as generally illustrated in FIG. 7, or by means of other suitable position indicating equipment. For simplicity, only the portion of an acoustic position indicating system for sensing location along the fore-aft vessel axis will be described. Location along an athwartship axis can be analogously determined.

The simplified acoustic position indicating system shown in FIGS. 6 and 7 comprises an acoustic transponder 154 which is located in a fixed positional relationship with an underwater wellhead or other point of interest. Prior to each position determination, an interrogator on board vessel 150 transmits an interrogate signal to transponder 154. The interrogate signal is shown transmitted from a projector 155, and is in the form of an acoustic signal comprising a tone pulse of carrier signal of frequency $f_O$ having a midpulse phase reversal, as illustrated by waveform 156. At a precise time after receipt of the interrogate pulse, transponder 154 transmits a responsive signal which is received by hydrophone apparatus 157 mounted on vessel 150.

For illustrative purposes, projector 155 is shown located away from hydrophone apparatus 157. However, in actual practice both the projector and the hydrophone apparatus may be located in the same area or may be incorporated into a single device. The acoustic signal transmitted by transponder 154 may be of any suitable form, including the same form as the interrogate signal. However, for purposes of distinguishing between interrogate and response signals in a practical system, it may be advantageous to at least use different carrier frequencies for the two signals.

As shown in FIG. 7, hydrophone apparatus 157 includes at least three hydrophone elements 158, 159 and 160, of which elements 158 and 159, and elements 159 and 160 are respectively located along orthogonal x and y axes. For purposes of the present explanation, the x axis may be assumed to coincide with the fore-aft axis of vessel 150.

With specific reference to fore-aft position sensing, angular displacement of hydrophone apparatus 157 from a position directly over transponder 154 is identified by angle $\theta_{vx}$. Hydrophone elements 158 and 159 respond to an acoustic tone pulse by producing electrical signals corresponding to the carrier signal of the pulse. The electrical signals are of a generally sinusoidal waveform, and are respectively illustrated by waveforms 161 and 162. The phases of waveforms 161 and 162 vary relative to one another in accordance with angle $\theta_{vx}$. The phase difference corresponds to a time difference $\Delta t$ between zero crossings in the same sense of waveforms 161 and 162.

Electrical signals produced by hydrophone elements 158 and 159 and a similar electrical signal produced by hydrophone element 160 are supplied to pulse detection and phase determination equipment wherein the electrical signals are processed in separate channels. Specifically, the electrical signals produced by hydrophone elements 158, 159 and 160 are supplied to phase detection subchannels 163, 164 and 165 in phase detection apparatus 166. Each of the phase detection subchannels produces a signal indicative of the phase of the signal received thereby relative to an internal reference signal. Simultaneously, the electrical signal produced by hydrophone element 159 is supplied to pulse detector 167 of the type disclosed herein. Phase determining apparatus suitable for implementing phase detection apparatus 166 is described in detail in previously identified U.S. Pat. No. 4,071,821 issued in the name of W. P. Harthill et al. Reference may be made to the patent for a more complete understanding of phase detection subchannels 163-165.

As shown for exemplary purposes in FIG. 7, the output signals of subchannels 163-165 and pulse detector 167 are supplied to a signal processor 169. Processor 169 samples the output signals of the phase detection subchannels when a pulse detection signal is received, and converts the electrical phase information into vessel position information. More specifically, processor 169 produces information as to vessel heading and vessel location along orthogonal horizontal axes. The output signals of processor 169 are supplied to a position display or indicator 170. In one form, indicator 170 may comprise a cathode ray tube in which the center of the screen represents vessel location, a triangular symbol 171 indicates a reference direction (e.g., north) relative to vessel heading represented by the top of the CRT screen, and a diamond symbol 172 indicates location of the point of interest relative to the vessel in a horizontal xy coordinate system.

As shown in the block diagram of FIG. 8, transponder 154 comprises a projector/hydrophone 174 which responds to an acoustic interrogate pulse by supplying a corresponding electrical signal. The electrical signal is passed through a transmit/receive network 175 to a pulse detector 176 of the type disclosed herein. Upon detection of a properly characterized signal, detector 176 supplies a pulse detection signal to a trigger delay circuit 177. After a precise delay period has elapsed, delay circuit 177 triggers a signal generator 178 which supplies a signal of predetermined characteristics to transmit/receive network 175. As previously indicated, this signal may be coded in a manner similar to the interrogate signal. Transmit/receive network 175 passes the signal supplied by generator 178 to projector/receiver 174 which, in turn, transmits a corresponding acoustic signal. Transmit/receive network 175 isolates pulse detector 176 from the signal supplied by generator 178. In accordance with the foregoing discussion, the use of tone pulses characterized by one or more carrier signal phase reversals for the interrogate and/or transponder output signals can provide for very precise pulse arrival detection and vessel position indication.

Atlhough a preferred embodiment of the applicant's unique quadrature correlation phase reversal pulse detector and detection method have been illustrated and described in detail, numerous variations and alternative embodiments in accordance with the teachings herein will be apparent to those skilled in the art. The scope of coverage sought to this invention is not to be limited to the disclosed embodiment, but only by the terms of the following claims.

The embodiments of the invention in which an exclusive property or right is claimed are defined as follows:

1. Detection apparatus for detecting a tone pulse of known carrier frequency having a phase reversal at a predetermined time during the pulse, said detection apparatus comprising:
    input means for supplying a tone pulse input signal;
    clipping means for hard limiting the input signal to produce a clipped signal having either of two instantaneous amplitudes;
    a reference signal source for generating first and second rectangular wave signals comprising quadrature components of a reference signal having a repetition rate equal to the carrier frequency and either of two instantaneous amplitudes substantially equal to those of the clipped signal;
    first and second digital multipliers for multiplying the clipped signal and each of the first and second rectangular wave signals to produce first and second product signals respectively, each having a first value when the instantaneous amplitudes of its multiplicand signals are substantially equal and a second value when the instantaneous amplitudes of its multiplicand signals are different;
    sampling means for sampling the first and second product signals at a sampling rate at least twice the highest frequency of interest in the envelope of the tone pulse to provide first and second sample trains respectively, each sample train comprising predetermined numbers of samples preceeding and following the carrier phase reversal in the tone pulse;
    first and second shift register means, each having an input terminal connected to receive a separate one of the first and second sample trains, an output terminal for subsequently supplying the sample train, a plurality of storage locations through which the samples are shifted seriatum between the input and output terminals and an intermediate tap for supplying samples intermediate the samples at the input and output terminals, the number of storage locations being sufficient to contain all samples of a tone pulse product signal and the number of storage locations following the intermediate tap being equal to the number of samples preceeding the phase reversal;
    first and second multiplier means each having an input terminal connected to the intermediate tap of a separate one of said first and second shift register means and an output terminal at which is produced an inverted and amplified signal corresponding to the samples at the intermediate tap;
    first and second summing means, each for adding the input and output samples of one of said first and second shift register means to the inverted and amplified signal produced by the multiplier means associated therewith;

first and second integrator means for integrating the output signals of said first and second summing means to produce first and second correlation signals respectively;

first and second rectifier means for respectively rectifying the first and second correlation signals;

third summing means for adding the output signals of said first and second rectifier means to produce an autocorrelation signal; and detection logic means for producing a pulse detection signal when the autocorrelation signal meets predetermined criteria.

2. The detection apparatus of claim 1 wherein:

the carrier phase reversal occurs at the midpoint of the tone pulse envelope; and the intermediate taps of said first and second shift register means are located so that equal numbers of storage locations precede and follow the intermediate taps.

3. The detection apparatus of claim 1 wherein the first and second multiplier means double the amplitudes of the samples at the intermediate taps of said first and second shift register means.

4. The detection apparatus of claim 1 wherein said detection logic means comprises:

a threshold detector for producing a threshold signal when the autocorrelation signal exceeds a predetermined amplitude; a peak detector for producing a peak indication signal when the autocorrelation signal reaches an amplitude peak; and an AND circuit for producing a pulse detection signal in response to simultaneous occurrence of threshold and peak indication signals.

5. A correlation type signal pulse detector for detecting a tone pulse of known duration and carrier frequency having a phase reversal at a predetermined time during the pulse, said detector comprising:

signal input means for supplying a clipped signal corresponding to the tone pulse carrier, said clipped signal having a rectangular wave form with an intermediate phase reversal;

a reference signal source for producing first and second quadrature related rectangular wave signals, each having a repetition rate equal to the carrier frequency;

a first correlation channel including a multiplier connected to receive and multiply the clipped signal and the first rectangular wave signal to produce a first product signal, delay means connected to receive a first input signal corresponding to the product of the clipped and first rectangular wave signals, said delay means providing a first signal delay period corresponding to the time between initiation of the tone pulse and the carrier phase reversal, and providing a second signal delay period equal to the duration of the tone pulse, and means for summing and integrating the undelayed first input signal, an amplified and inverted version of the first input signal delayed for the first delay period and the first input signal delayed for the second delay period to produce a first correlation signal indicative of the degree of correlation between the clipped signal and the first rectangular wave signal;

a second correlation channel including a multiplier connected to receive and multiply the clipped signal and the second rectangular wave signal to produce a second product signal, delay means connected to receive a second input signal corresponding to the product of the clipped and second rectangular wave signals, said delay means providing a first signal delay period corresponding to the time between initiation of the tone pulse and the carrier phase reversal, and providing a second signal delay period equal to the duration of the tone pulse, and means for summing and integrating the undelayed second input signal, an amplified and inverted version of the second input signal delayed for the first delay period and the second input signal delayed for the second delay period to produce a second correlation signal indicative of the degree of correlation between the clipped signal and the second rectangular wave signal;

means for combining the first and second correlation signals to produce an autocorrelation signal; and detection logic means for producing a pulse detection signal when the autocorrelation signal exhibits characteristics indicative of the presence of a tone pulse input signal.

6. The pulse detector of claim 5 wherein each of said first and second correlation channels comprises:

a sample gate for sampling one of the first and second product signals at a rate at least twice the highest frequency of interest in the envelope of the tone pulse and not integrally related to the carrier frequency to produce a sample train;

delay register means through which samples in the sample train are shifted seriatum, said delay register means having first and second register portions with capacities to contain all samples of a tone pulse product signal respectively preceeding and following the carrier phase reversal and an intermediate tap between the first and second register portions;

multiplier means connected to receive samples at the intermediate tap of said delay register means, said multiplier means being operable to invert and amplify the samples received thereby;

first summing means;

means for supplying the input and output signals of said delay register means and the output signal of said multiplier means to said first summing means; and an integrator connected to receive the output signal of said first summing means.

7. The pulse detector of claim 6 wherein said delay register means comprises a shift register having an input terminal connected to receive the sample train, an intermediate tap, an output terminal for subsequently supplying the sample train and a predetermined number of storage locations through which samples are shifted seriatum at the sampling rate, the number of storage locations being equal to the number of samples of a tone pulse product signal and the intermediate tap being followed by a number of storage locations equal to the number of samples of a tone pulse product signal preceeding the carrier phase reversal.

8. The pulse detector of claim 7 wherein said means for combining the first and second correlation signals comprises:

a first rectifier connected to receive the output signal of the integrator in said first correlation channel;

a second rectifier connected to receive the output signal of the integrator in said second correlation channel; and second summing means for summing the output signals of said first and second rectifiers.

first product signal, delay means connected to receive a first product signal corresponding to the product of the clipped and first rectangular wave signals, said delay means providing a first signal delay period corresponding to the time between initiation of a tone pulse and its carrier phase reversal, and providing a second signal delay period equal to the duration of the tone pulse, and means for summing and integrating the first undelayed product signal, an amplified and inverted version of the first product signal delayed for the first delay period and the first product signal delayed for the second delay period to produce a first correlation signal indicative of the degree of correlation between the clipped signal and the first rectangular wave signal;

a second correlation channel including a multiplier connected to receive and multiply the clipped signal and the second rectangular wave signal to produce a second product signal, delay means connected to receive a second product signal corresponding to the product of the clipped and second rectangular wave signals, said delay means providing a first signal delay period corresponding to the time between initiation of a tone pulse and its carrier phase reversal, and providing a second signal delay period equal to the duration of the tone pulse, and means for summing and integrating the undelayed second product signal, an amplified and inverted version of the second product signal delayed for the first delay period and the second product signal delayed for the second delay period to produce a second correlation signal indicative of the degree of correlation between the clipped signal and the second rectangular wave signal;

means for combining the first and second correlation signals to produce an autocorrelation signal; and detection logic for producing a pulse detection signal when the autocorrelation signal exhibits characteristics indicative of the presence of a tone pulse signal.

17. The position indicating system of claim 16 wherein each of said first and second correlation channels comprises:
   a sample gate for sampling one of the first and second product signals at a rate at least twice the highest frequency of interest in the envelope of the tone pulse to produce a sample train;
   delay register means through which samples in the sample train are shifted seriatum, said delay register means having first and second register portions with capacities to contain all samples of a tone pulse product signal respectively preceeding and following the carrier phase reversal and an intermediate tap between the first and second register portions;
   multiplier means connected to receive samples at the intermediate tape of said delay register means, said multiplier means operating to invert and increase the amplitude of the samples received thereby;
   first summing means;
   means for supplying concurrent input and output samples of said delay register means and the concurrent output signal of said multiplier means to said first summing means; and
   an integrator for integrating the output signal of said first summing means.

18. The position indicating system of claim 17 wherein said means for combining the first and second correlation signals comprises:
   first and second rectifiers respectively connected to receive the output signals of the integrators in said first and second correlation channels; and
   second summing means for summing the output signals of said first and second rectifiers.

19. In a marine vessel position indicating system comprising an acoustic signal source located in a known positional relationship with an underwater point of interest for transmitting a tone pulse signal of known carrier frequency having a phase reversal at a predetermined time during each pulse, an array of hydrophone elements located on the vessel, means for sensing phase differences between tone pulse signals received at pairs of hydrophone elements and computation apparatus for determining location of the hydrophone array relative to the signal source from the phase differences, an improved tone pulse detector comprising:
   signal input means for converting the received tone pulse signal into an input signal wherein the carrier is hard limited to form a clipped signal;
   a reference signal source for producing first and second quadrature related rectangular wave signals, each having a repetition rate equal to the carrier frequency;
   a first correlation channel including a multiplier connected to receive and multiply the clipped signal and the first rectangular wave signal, delay means connected to receive a first product signal corresponding to the product of the clipped and first rectangular wave signals, said delay means providing a first signal delay period corresponding to the time between initiation of a tone pulse and its carrier phase reversal, and providing a second signal delay period equal to the duration of the tone pulse, and means for summing and integrating the undelayed first product signal, an amplified and inverted version of the first product signal delayed for the first delay period and the first product signal delayed for the second delay period to produce a first correlation signal indicative of the degree of correlation between the clipped signal and the first rectangular wave signal;
   a second correlation channel including a multiplier connected to receive and multiply the clipped signal and the second rectangular wave signal, delay means connected to receive a second product signal corresponding to the product of the clipped and second rectangular wave signals, said delay means providing a first signal delay period corresponding to the time between initiation of a tone pulse and its carrier phase reversal, and providing a second signal delay period equal to the duration of the tone pulse, and means for summing and integrating the undelayed second product signal, an amplified and inverted version of the second product signal delayed for the first delay period and the second product signal delayed for the second delay period to produce a second correlation signal indicative of the degree of correlation between the clipped signal and the second rectangular wave signal;
   means for combining the first and second correlation signals to produce an autocorrelation signal; and
   detection logic for producing a pulse detection signal when the autocorrelation signal exhibits characteristics indicative of the presence of a tone pulse signal.

* * * * *

9. The pulse detector of claim 8 wherein said multiplier means doubles the amplitude of samples received thereby.

10. The pulse detector of claim 9 wherein said detector logic comprises:
a threshold detector for producing a threshold signal when the autocorrelation signal exceeds a predetermined amplitude;
a peak detector for producing a peak indication signal when the autocorrelation signal reaches an amplitude peak; and
an AND circuit connected to receive the threshold and peak indication signals, and operable to produce a pulse detection signal upon simultaneous occurrence of threshold and peak indication signals.

11. The pulse detector of claim 10 wherein said peak detector comprises a differentiator for differentiating the autocorrelation signal and a zero crossing detector for producing the peak indication signal when the state of the differentiator output signal indicates a decreasing autocorrelation signal.

12. In apparatus for detecting a coded tone pulse in an input signal, the coded tone pulse being characterized by a known duration and known carrier frequency having a carrier phase reversal at a predetermined time during the pulse, a pulse detection method comprising the steps of:
multiplying the input signal with each of first and second quadrature related components of a reference signal having a repetition rate equal to the carrier frequency;
delaying a first product signal corresponding to the product of the input signal and the first component of the reference signal for first and second delay periods corresponding respectively to the time between initiation of the tone pulse and the carrier phase reversal, and to the duration of the tone pulse;
delaying a second product signal corresponding to the product of the input signal and the second component of the reference signal for first and second delay periods corresponding respectively to the time between initiation of the tone pulse and the carrier phase reversal, and to the duration of the tone pulse;
summing and integrating the first product signal, an amplified and inverted version of the first product signal delayed for the first delay period and the first product signal delayed for the second delay period to produce a first correlation signal;
summing and integrating the second product signal, an amplified and inverted version of the second product signal delayed for the first delay period and the second product signal delayed for the second delay period to produce a second correlation signal;
rectifying the first and second correlation signals;
summing the rectified first and second correlation signals to produce an autocorrelation signal; and
producing a pulse detection signal when the autocorrelation signal exhibits predetermined characteristics indicative of the presence of the coded tone pulse.

13. The pulse detection method of claim 12 signal comprising the further steps of:
hard limiting the input signal to produce a clipped signal having first or second instantaneous amplitudes;
generating first and second quadrature related rectangular wave signals having repetition rates equal to the carrier frequency and first and second instantaneous amplitudes substantially equal to the amplitudes of the clipped signal;
multiplying the clipped signal and each of the rectangular wave signals;
sampling the signals produced by multiplying the clipped signals and each of the rectangular wave signals at a sampling rate at least twice the highest frequency of interest in the envelope of the tone pulse to produce first and second sample trains;
forming a moving time interval of a duration equal to the duration of the coded tone pulse;
selecting intermediate samples in each sample train at a fixed time during the moving time interval corresponding to the time of the carrier phase reversal during a pulse;
inverting and doubling the amplitude of the selected samples;
summing the inverted and doubled samples from each sample train with concurrent samples in the same train at the beginning and end of the moving time interval to produce first and second summation signals; and
integrating the first and second summation signals.

14. The pulse detection method of claim 13 wherein:
a carrier phase reversal occurs at the midpoint of the tone pulse; and
the intermediate samples are selected from the first and second sample trains at the midpoint of the moving time interval.

15. The pulse detection method of claim 14 wherein the step of producing a pulse detection signal comprises the further steps of:
determining when the autocorrelation signal exceeds a predetermined threshold amplitude;
determining when the autocorrelation signal achieves an amplitude peak; and
producing the peak detection signal when the autocorrelation signal simultaneously exceeds the predetermined threshold and achieves an amplitude peak.

16. In a marine vessel position indicating system comprising phase computation apparatus and an array of hydrophone elements located on the vessel for determining the location of the vessel relative to a transponder from transponder signals received by pairs of hydrophone elements, the transponder signals being produced in response to tone pulse interrogate signals of known carrier frequency having a phase reversal at a predetermined time during each pulse, the transponder including an improved pulse detector for precisely detecting interrogate tone pulse signals comprising:
signal input means for converting each received interrogate tone pulse signal into an input signal wherein the carrier is hard limited to form a clipped signal;
a reference signal source for producing first and second quadrature related rectangular wave signals, each having a repetition rate equal to the carrier frequency;
a first correlation channel including a multiplier connected to receive and multiply the clipped signal and the first rectangular wave signal to produce a